(12) United States Patent
Suzuki (10) Patent No.: US 8,139,500 B2
(45) Date of Patent: Mar. 20, 2012

(54) INFORMATION PROCESSING DEVICE AND METHOD THEREOF, AND COMPUTER PROGRAM PRODUCT

(75) Inventor: Katsunori Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 757 days.

(21) Appl. No.: 11/822,567

(22) Filed: Jul. 6, 2007

(65) Prior Publication Data

US 2008/0019290 A1    Jan. 24, 2008

(30) Foreign Application Priority Data

Jul. 20, 2006 (JP) .................................. 2006-198527

(51) Int. Cl.
*H04L 12/28* (2006.01)
(52) U.S. Cl. ........................................ 370/254; 370/389
(58) Field of Classification Search .......................... None
See application file for complete search history.

(56) References Cited

U.S. PATENT DOCUMENTS

| | | | | |
|---|---|---|---|---|
| 5,699,495 A | * | 12/1997 | Snipp | 358/1.15 |
| 6,111,894 A | * | 8/2000 | Bender et al. | 370/469 |
| 6,757,647 B1 | * | 6/2004 | Nathan et al. | 704/10 |
| 7,181,089 B2 | * | 2/2007 | Esaki et al. | 382/287 |
| 7,316,022 B2 | * | 1/2008 | Nishio | 719/321 |
| 7,861,033 B2 | * | 12/2010 | Chang et al. | 711/112 |
| 2003/0231328 A1 | * | 12/2003 | Chapin et al. | 358/1.13 |
| 2004/0120344 A1 | * | 6/2004 | Sato et al. | 370/465 |
| 2004/0243683 A1 | * | 12/2004 | Yamauchi | 709/208 |
| 2005/0180791 A1 | | 8/2005 | Kujirai | |
| 2007/0192472 A1 | * | 8/2007 | Tokunaga et al. | 709/223 |
| 2008/0019290 A1 | * | 1/2008 | Suzuki | 370/254 |
| 2008/0104338 A1 | * | 5/2008 | Kinoshita et al. | 711/152 |

FOREIGN PATENT DOCUMENTS

| | | |
|---|---|---|
| CN | 1658146 A | 8/2005 |
| JP | 11-212742 | 8/1999 |
| JP | 2000-181641 | 6/2000 |
| JP | 2002-248831 | 9/2002 |
| JP | 2002-259097 | 9/2002 |
| JP | 2004-072247 | 3/2004 |
| JP | 2004-246620 | 9/2004 |
| JP | 2006-011666 | 1/2006 |

\* cited by examiner

*Primary Examiner* — Robert Wilson
(74) *Attorney, Agent, or Firm* — Dickstein Shapiro LLP (57) ABSTRACT

An information processing device is configured to be connected via a network to a plurality of external devices and output data through one of the external devices. The information processing device includes a characteristic information acquiring unit, a device searching unit, and a port generating unit. The characteristic information acquiring unit acquires characteristic information related to data to be output. The device searching unit searches for an external device through which the data is to be output based on the characteristic information. The port generating unit generates an output port to the external device. The data is transmitted to the external device through the output port.

19 Claims, 9 Drawing Sheets

| CHARACTERISTIC INFORMATION | SEARCH CONDITION |
|---|---|
| PRINTER DRIVER NAME INCLUDES CHARACTER STRING PS | PostScript PRINTER |
| PRINTER DRIVER NAME INCLUDES CHARACTER STRING COLOR | COLOR PRINTER |
| JAPANESE OS | JAPANESE FONTS AVAILABLE |
| NO LESS THAN 50 PAGES | HIGH-SPEED PRINTING |
| PHOTO-RETOUCHING SOFTWARE IS USED | HIGH-QUALITY PRINTING |

SEARCH RESULTS 306

⚠ PRINT CONDITIONS AND NETWORK PRINTER FUNCTIONS: SELECT PRINTER.

| PRINTER NAME | IP ADDRESS | PRINTER LANGUAGE | COLOR |
|---|---|---|---|
| ⦿ ABC Color 6000 | ***.168.0.100 | PostScript | OK |
| ○ ABC Color 6000 | ***.168.0.101 | PostScript | OK |
| ○ ABC Color 7100 | ***.168.0.108 | PostScript | OK |
| ○ ABC Color 6000 | ***.168.0.111 | PCL | OK |
| ○ ABC Color 7200 | ***.168.0.123 | PostScript | NOT OK |
| ○ ABC Color 8100 | ***.168.0.154 | PostScript | NOT OK |
| PRINT CONDITION→ | | PostScript | NECESSARY |

YES    NO

INFORMATION PROCESSING DEVICE AND METHOD THEREOF, AND COMPUTER PROGRAM PRODUCT

CROSS-REFERENCE TO RELATED APPLICATIONS

The present document incorporates by reference the entire contents of Japanese priority document, 2006-198527 filed in Japan on Jul. 20, 2006.

BACKGROUND OF THE INVENTION

1. Field of the Invention

The present invention relates to an information processing device and method thereof, and a computer program product.

2. Description of the Related Art

Printing of locally stored image data such as those created by an application, online image data, and the like requires a printer driver that is compatible with a printer used to print the image data. Such printing also requires setting up a port using a Transmission Control Protocol/Internet Protocol (TCP/IP) for transmitting print data generated by the printer driver to the printer.

In recent years, people often carry a mobile personal computer (PC) with them for outside use. When a need for printing arises at an outside location, they are necessitated to use a printer available on the spot. It is, however, not likely that a printing environment has already been established on their mobile PC to perform printing on the outside printer.

Meanwhile, for, example, some recent printer drivers such as a BMLinkS (registered trademark) printer driver are less machine-dependent. Thus, if the outside printer is compatible with such a printer driver, printing is possible using the printer driver installed on their own mobile PC.

Additionally, Japanese Patent Application Laid-Open No. 2004-246620 discloses a technology in which a printer for a print job is selected based on a first image forming condition providable by a plurality of printers and a second image forming condition set by a user.

However, even when a mobile PC includes a printer driver corresponding to a printer at an outside location, it is still necessary to set up a port. Accordingly, a troublesome task remains for a user.

Setting up a port often requires an IP address of a printer. The IP address can be acquired by directly operating a console of the printer. However, due to increasing security concerns, many more recent printers require log-in information for operation or knowledge of a special operation for acquiring the IP address thereof.

Although such printer information may be acquired through a network available outside, a user needs to install special software in advance or preregister various information in a domain of the outside location to use the outside network.

Consequently, even for a small amount of printing, the user has to establish a printing environment for the job. This results in inconvenience to the user.

SUMMARY OF THE INVENTION

It is an object of the present invention to at least partially solve the problems in the conventional technology.

According to an aspect of the present invention, an information processing device that is configured to be connected via a network to a plurality of external devices and output data through one of the external devices, includes an information acquiring unit that acquires characteristic information related to data to be output, a searching unit that searches for an external device through which the data is to be output based on the characteristic information, an output channel generating unit that generates an output channel to the external device, and a transmitting unit that transmit the data to the external device through the output channel.

According to another aspect of the present invention, an information processing method applied to an information processing device that is configured to be connected via a network to a plurality of external devices and output data through one of the external devices, includes acquiring characteristic information related to data to be output, searching for an external device through which the data is to be output based on the characteristic information, generating an output channel to the external device, and transmitting the data to the external device through the output channel.

According to still another aspect of the present invention, a computer program product includes a computer program that implements the above methods on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
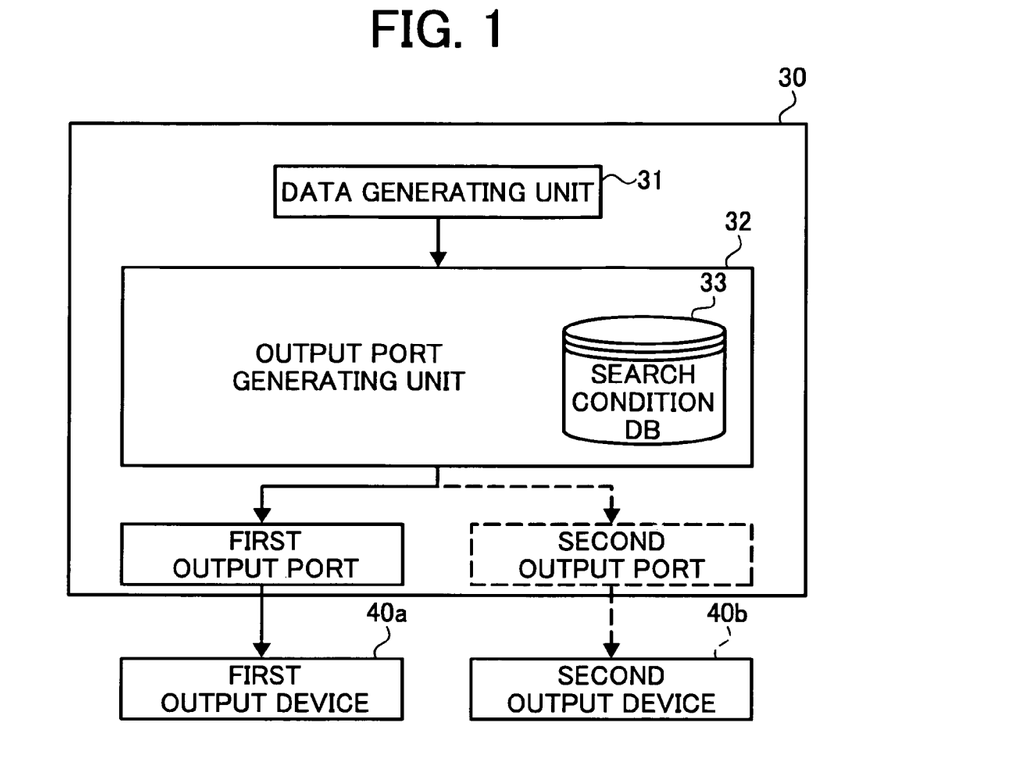
FIG. 1 is a functional block diagram of an information processing device according to an embodiment of the invention.

FIG. 1 a functional block diagram of an information processing device 30 according to an embodiment of the invention. The information processing device 30 includes a data generating unit 31 and an output port generating unit 32. The output port generating unit 32 includes a search condition database (DB) 33.

The data generating unit 31 generates data to be transmitted to an output device. The output port generating unit 32 generates an output port as an output channel for outputting the data generated by the data generating unit 31 to the output device. At this time, the search condition DB 33 is accessed for reference.

Figure 2:
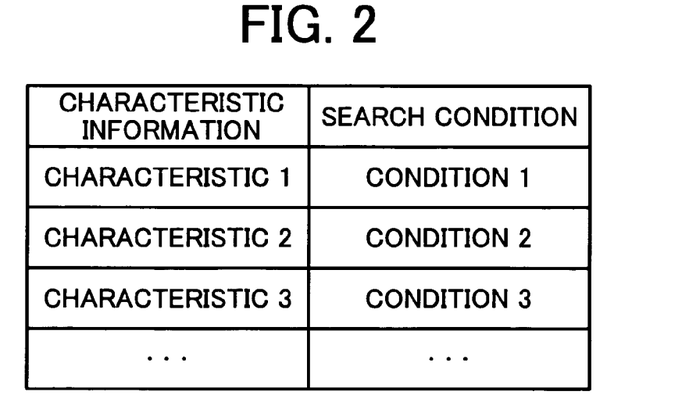
FIG. 2 is an example of a data structure of a search condition database (DB) shown in FIG. 1.

FIG. 2 is an example of a data structure of the search condition DB 33. The search condition DB 33 stores therein such items as characteristic information and search condition in an associated manner. The characteristic information represents characteristics of an operational environment of the data generating unit 31. The search condition is used for searching for a device to output data from first and second output devices 40a and 40b.

As explained above, the characteristic information and the search condition are stored in an associated manner. Therefore, detecting characteristic information of data generated by the data generating unit 31 allows extraction of a search condition for searching for a device suitable to output data.

The output port generating unit 32 acquires characteristic information of the data generated by the data generating unit 31, and refers to the search condition DB 33 to acquire a search condition. The output port generating unit 32 specifies an output device that satisfies the search condition from the connectable output devices 40a and 40b, and generates an output port for transmitting the data to the specified output device. Then, the data generated by the data generating unit 31 is transmitted from the generated output port.

In this manner, an output port is generated according to an output device specified based on a search condition corresponding to the characteristics of generated data. As a result, data can be output to a suitable output device without setting thereof for each printing job.

Figure 3:
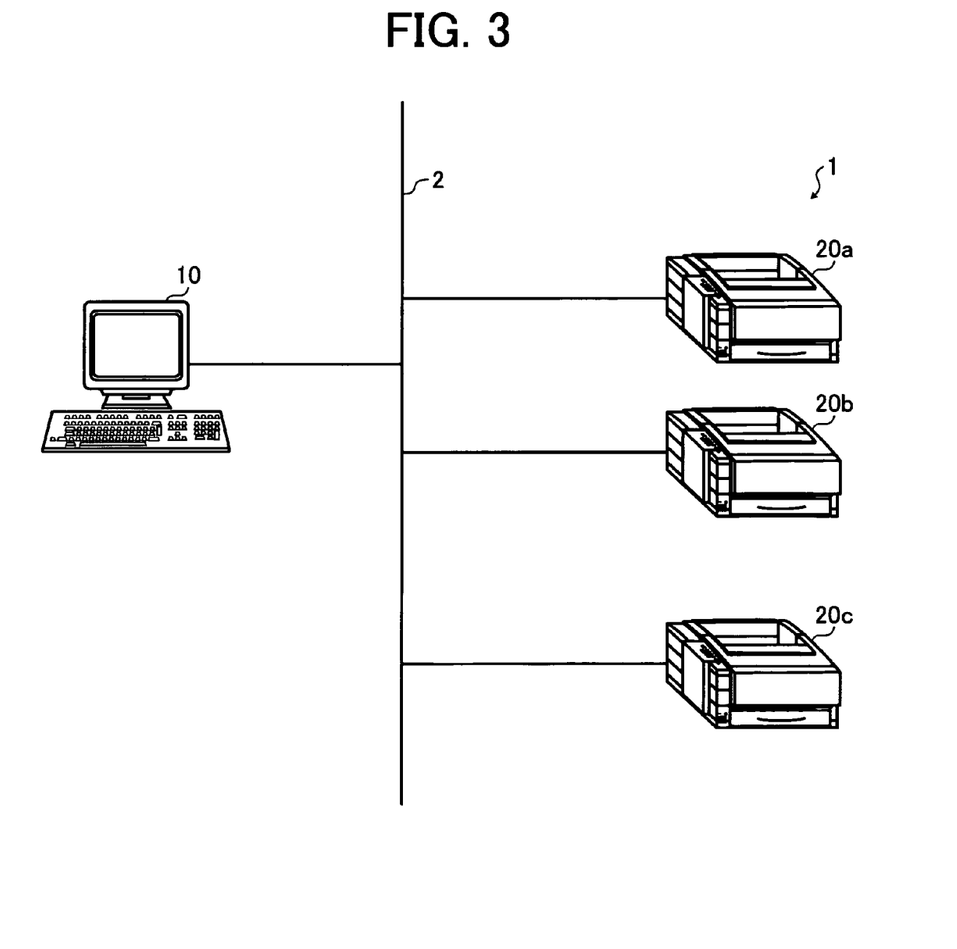
FIG. 3 is a schematic diagram of a printing system including the information processing device.

FIG. 3 is a schematic diagram of a printing system 1 according to the embodiment. The printing system 1 includes a terminal device 10 as an information processing device, a first printer 20a, a second printer 20b, and a third printer 20c, each being an external device. These external devices are connected to the terminal device 10 via a network 2.

The terminal device 10 can be, for example, a mobile terminal. The terminal device 10 selects one of the printers 20a, 20b, and 20c, and issues a print command to instruct the selected printer to print data as a print object. Upon receipt of the print command, the selected printer prints the data.

Figure 4:
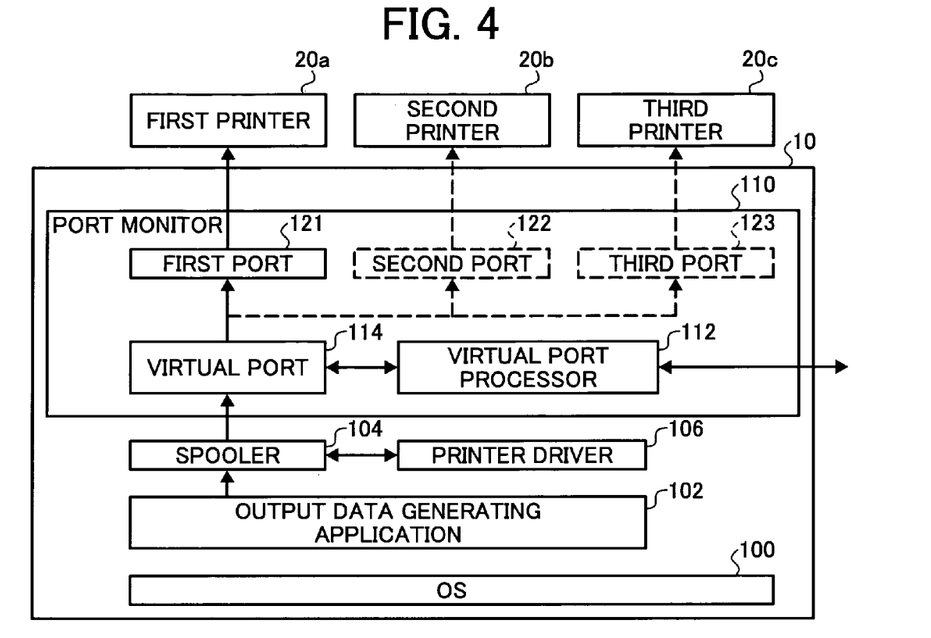
FIG. 4 is a functional block diagram of a terminal device shown in FIG. 3.

FIG. 4 is a functional block diagram of the terminal device 10. The terminal device 10 includes an operating system (OS) 100, an output data generating application 102, a spooler 104, a printer driver 106, and a port monitor 110.

The OS 100 controls a computer system. The output data generating application 102, which is software run on the terminal device 10, edits and processes data containing characters and images. Examples of the output data generating application 102 include text editing software, spreadsheet software, and image editing software. The output data generating application 102 generates data to be printed by any one of the printers 20a to 20c. The output data generating application 102 sends the data and a print command to the printer driver 106 via the spooler 104.

The spooler 104 temporarily stores (spools) therein various data subjected to a print command issued to the printers 20a to 20c, and sequentially sends the data to the printer driver 106. The printer driver 106 is software that generates print data printable by the printers 20a to 20c from various data stored in the terminal device 10. Specifically, the printer driver 106 receives data and a print command from the output data generating application 102 via the spooler 104. Next, based on the received data and the print command, the printer driver 106 generates print data described in a printer language, such as Printer JOB Language (PJL), readable by the printers 20a to 20c.

The port monitor 110 monitors an output port. The output port is an output channel using TCP/IP. Specifically, the port monitor 110 selects the output port according to an output data destination, i.e., a printer where the print data is to be sent.

By way of example and without limitation, as the output port is cited above an output channel using TCP/IP. It is only necessary to be an output channel on a network.

In the example shown in FIG. 4, the port monitor 110 selects any one of a first port 121 corresponding to the first printer 20a, a second port 122 corresponding to the second printer 20b, and a third port 123 corresponding to the third printer 20c. A virtual port 114 is also used in place of a real port. The port monitor 110 selects the virtual port 114 in response to an instruction from a user.

The port monitor 110 includes a virtual port processor 112. The virtual port processor 112 performs processing related to the virtual port selected based on the instruction from a user. For example, the virtual port processor 112 selects an output destination suitable for print data from a plurality of output destinations, and generates an output channel to the selected output destination as the virtual port. After the print data is transmitted from the generated virtual port, the virtual port processor 112 deletes the output port generated as the virtual one.

Figure 5:
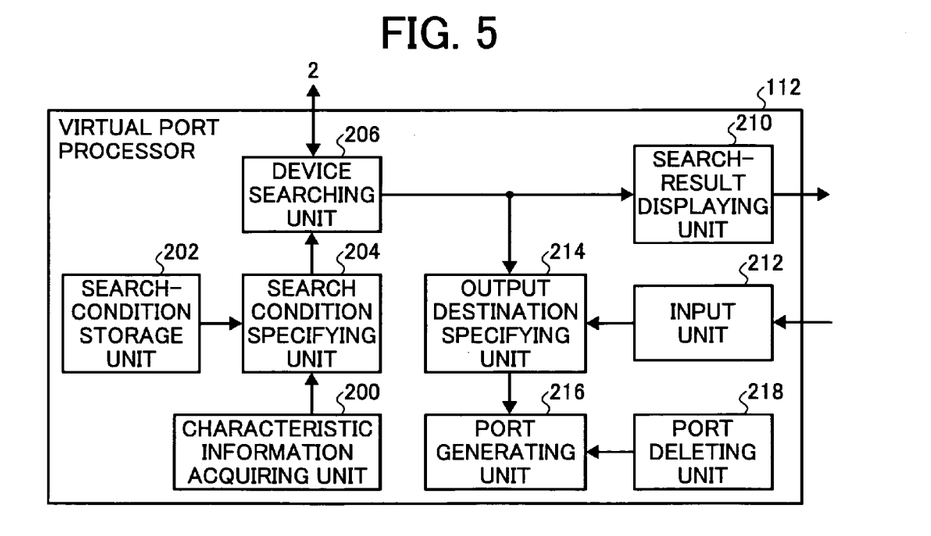
FIG. 5 is a functional block diagram of a virtual port processor shown in FIG. 4.

FIG. 5 is a functional block diagram of the virtual port processor 112. The virtual port processor 112 includes a characteristic information acquiring unit 200, a search-condition storage unit 202, a search condition specifying unit 204, a device searching unit 206, a search-result display unit 210, an input unit 212, an output destination specifying unit 214, a port generating unit 216, and a port deleting unit 218.

The characteristic information acquiring unit 200 acquires characteristic information indicating the characteristics of target data. Examples of the characteristic information include a name of the printer driver 106 that generates print data from the target data. Other than the printer driver 106, the characteristic information can be acquired from the output data generating application 102 and the OS 100.

The characteristic information can also be acquired from another device (not shown) connected via the network 2. For example, when the terminal device 10 acquires target data generated by an output data generating application installed on another device and specifies an output destination of the target data, characteristic information regarding the data is acquired from the other device.

The search-condition storage unit 202 stores therein such items as characteristic information and search condition in an associated manner. The search condition is used for searching for an output destination suitable for target data. From the search-condition storage unit 202, the search condition specifying unit 204 extracts a search condition associated with characteristic information acquired by the characteristic information acquiring unit 200. Then, the search condition specifying unit 204 specifies the extracted search condition as a search condition for an output destination of the target data. For example, having extracted a plurality of search conditions, the search condition specifying unit 204 removes "and" joining them, and specifies them as the search conditions.

The device searching unit 206 searches for an output destination that satisfies the search condition specified by the search condition specifying unit 204 via the network 2. Specifically, the device searching unit 206 searches the printers 20a to 20c connected to the network 2 using a Simple Network Management Protocol (SNMP) and a Web Service, for example.

The search-result display unit 210 displays a search result obtained by the device searching unit 206 on a display screen. The input unit 212 receives user input specifying an output destination selected by a user. The output destination specifying unit 214 specifies the output destination based on the obtained search result and the input received from the user. The port generating unit 216 generates an output port to the output destination specified by the output destination specifying unit 214, and assigns it to the virtual port. The port deleting unit 218 deletes the virtual output port generated by the port generating unit 216.

Figure 6:
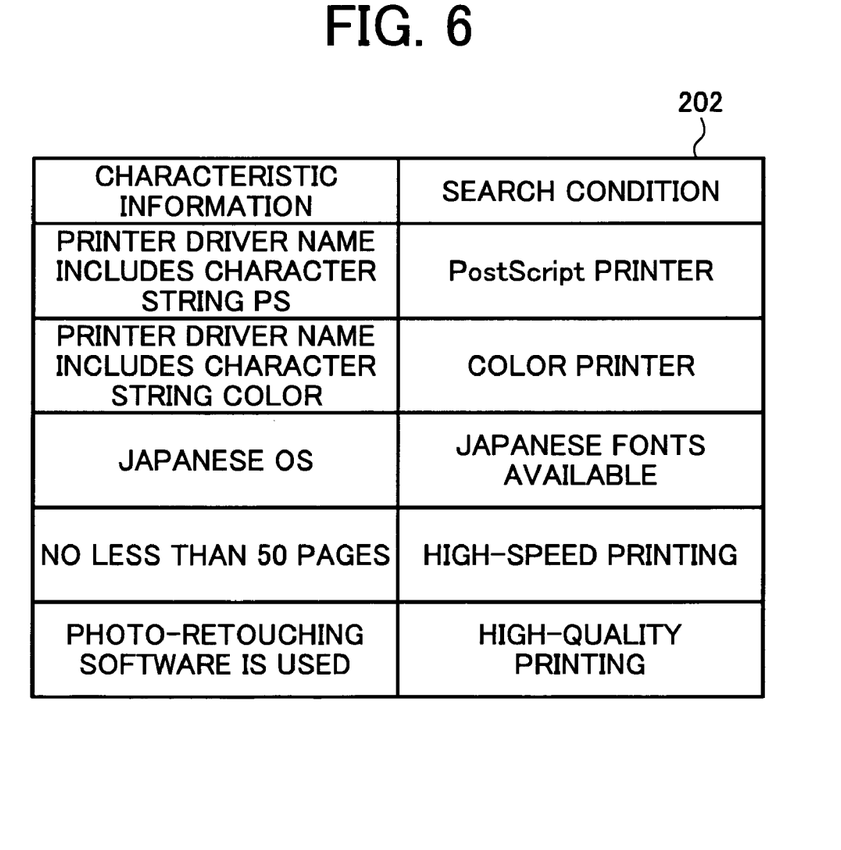
FIG. 6 is an example of data stored in a search-condition storage unit shown in FIG. 5.

FIG. 6 is an example of data stored in the search-condition storage unit 202. Characteristic information "Printer driver name includes a character string PS" corresponds to a search condition "PostScript printer". For example, when a printer driver with a name "ABC PS" is mounted on the terminal device 10, the characteristic information acquiring unit 200 acquires the characteristic information "Printer driver name includes a character string PS". Characteristic information related to a printer driver name is acquired from the printer driver 106. The search condition specifying unit 204 extracts the search condition "PostScript printer", i.e., PostScript is installed.

Characteristic information "Printer driver name includes a character string COLOR" corresponds to a search condition "Color printer". Characteristic information "Japanese OS" corresponds to a search condition "Japanese fonts available". The characteristic information acquiring unit 200 acquires OS-related characteristic information from the OS 100.

Characteristic information "No less than 50 pages" corresponds to a search condition "High-speed printing". The characteristic information acquiring unit 200 acquires characteristic information related to a document length from the spooler 104. Characteristic information "Photo-retouching software is used" corresponds to a search condition "High-quality printing". The characteristic information acquiring unit 200 acquires characteristic information related to application software from the output data generating application 102.

As explained above, characteristic information related to a printer language used and functional characteristics such as color or monochrome is associated with a search condition. Thus, based on the characteristic information, a search condition can be specified.

A search condition can be specified based on characteristic information related to a hardware configuration, such as the presence of a finisher. The characteristic information can be extracted from a printer driver name. To easily identify the presence of hardware from a printer driver name, for example, a driver name "ABC Duplex Printer" can be assigned to a printer driver that issues a print command to a printer with a finisher. In this manner, an acquired driver name can provide characteristic information related to a hardware configuration.

Figure 7A:
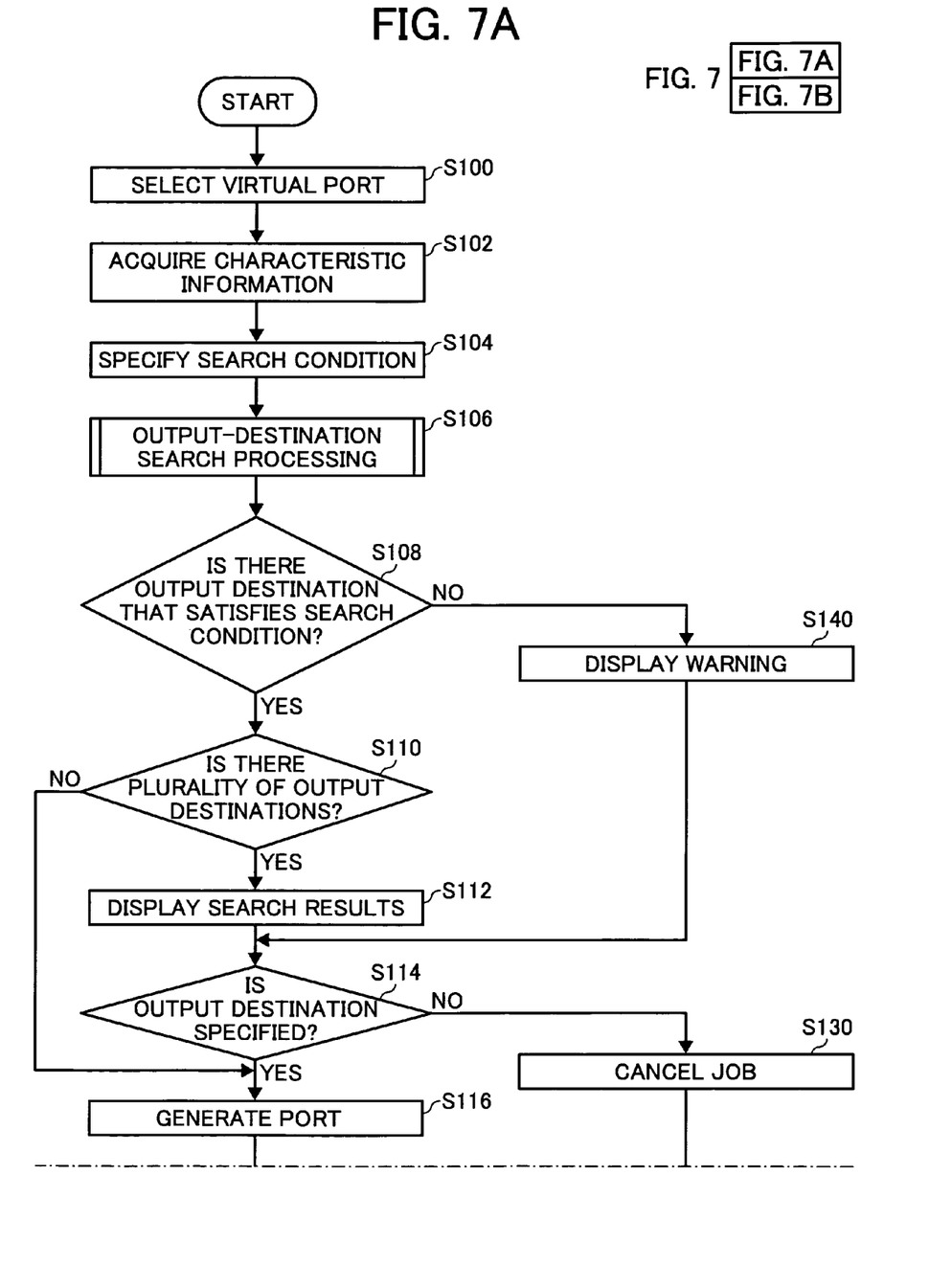
FIG. 7 is a flowchart of information processing to specify an output destination performed by the terminal device.
Figure 7B:
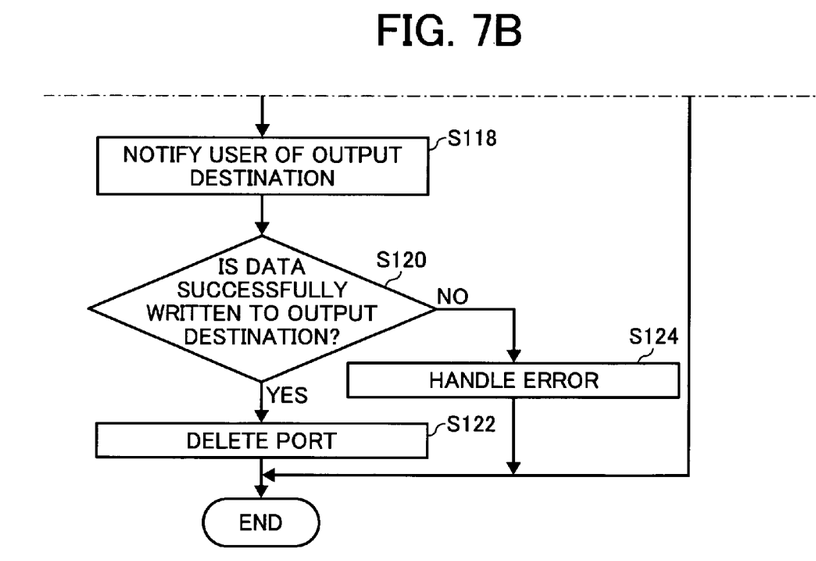

FIG. 7 is a flowchart of information processing to specify an output destination performed by the terminal device 10. First, a user selects the virtual port as an output destination of target data, and provides input specifying the virtual port through the input unit 212 (step S100). After receiving the input, the characteristic information acquiring unit 200 acquires characteristic information of the target data corresponding to the virtual port selection based on a "Start-DocPort" function (step S102).

Next, from the search-condition storage unit 202, the search condition specifying unit 204 extracts and specifies a search condition corresponding to the characteristic information acquired by the characteristic information acquiring unit 200 (step S104). Then, the device searching unit 206 searches for an output destination that satisfies the search condition by an inquiry to the printers 20a to 20c (step S106).

Figure 8:
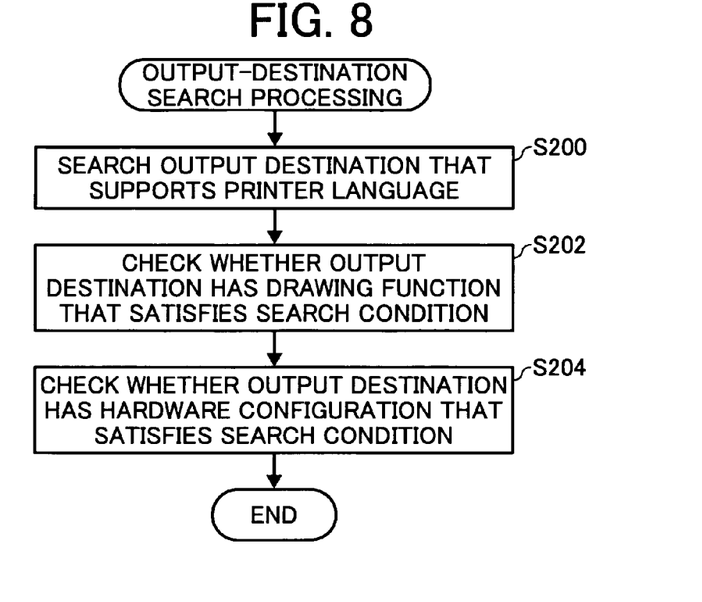
FIG. 8 is a detailed flowchart of output-destination search processing shown in FIG. 7.

FIG. 8 is a detailed flowchart of output-destination search processing performed at step S106 in FIG. 7. First, the search-result display unit 210 checks whether there is any printer that supports a printer language defined by the search condition (step S200). For example, through the SNMP, the search-result display unit 210 inquires a network device identified as a printer about its supporting printer language. Additionally, the search-result display unit 210 checks whether the printer satisfies other search conditions. For example, the search-result display unit 210 checks whether the printer has a drawing function that satisfies a search condition (step S202). Specifically, the search-result display unit 210 checks availability of color printing or print resolution levels.

The search-result display unit 210 also checks whether the printer has a hardware configuration that satisfies the search condition (step S204). Specifically, the search-result display unit 210 checks the presence of staple and punch functions, a paper size, and a medium type.

Referring back to FIG. 7, through the data output-destination search processing (step S106), the search-result display unit 210 determines whether there is any output destination that satisfies the search condition (step S108).

There may be a case where the search condition specifying unit 204 specifies a plurality of search conditions joined by "and". In such case, the search-result display unit 210 determines whether there is any output destination that satisfies all the search conditions.

When a plurality of output destinations satisfies the search condition (Yes at step S110), the search-result display unit 210 displays the search results on a search result screen 300 (step S112).

Figure 9:
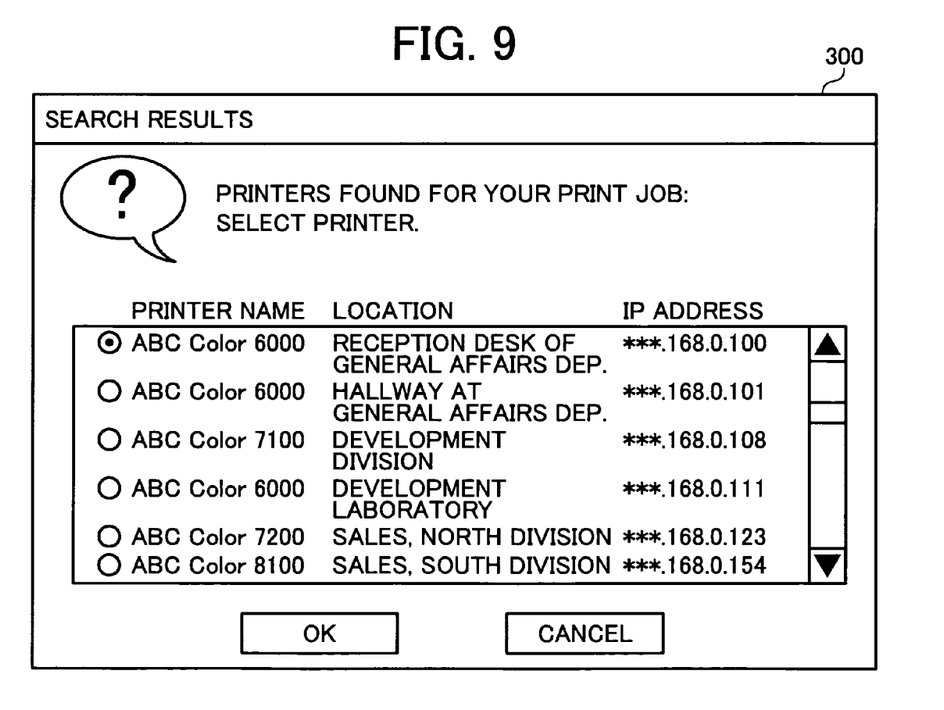
FIG. 9 is an example of a search result screen.

FIG. 9 is an example of the search result screen 300. The search result screen 300 displays all the output destinations that satisfy the search condition with information on them. Examples of the information on the output destinations include printer name, location, and IP address. The user can select a desired printer-on the search result screen 300.

When the user selects a printer on the search result screen 300, the input unit 212 receives user input specifying the printer as an output destination (Yes at step S114). From among the output destinations displayed on the search result screen 300, the output destination specifying unit 214 specifies the output destination selected through the input unit 212 as an output destination of the target data. Then, the port generating unit 216 generates an output port to the specified output destination (step S116), and notifies the user of the output destination (step S118). Specifically, the output destination is displayed on the display screen.

In this manner, without any need for the user to input information on an output destination such as an IP address, an output destination suitable for target data can be automatically detected. Moreover, an output port to the output destination selected by the user can be automatically generated. Therefore, the user does not have to perform any complicated operation as well as preregistering a port.

Based on a "WritePort" function, the target data is written to the output destination. When the target data is successfully written (Yes at step S114), the port deleting unit 218 disconnects the output destination based on an "EndDocPort" function to delete the output port generated by the port generating unit 216 (step S122). When the writing of the target data fails (No at step S120), error handling is performed (step S124).

Even if port addition is requested by an "AddPort" function, port addition is not performed. Then, the user is notified that port addition is rejected. In this manner, the embodiment employs only one virtual port, without port addition.

When user input specifying an output destination is not received within a predetermined period of time (No at step S114), the print job is cancelled (step S130).

Figure 10:
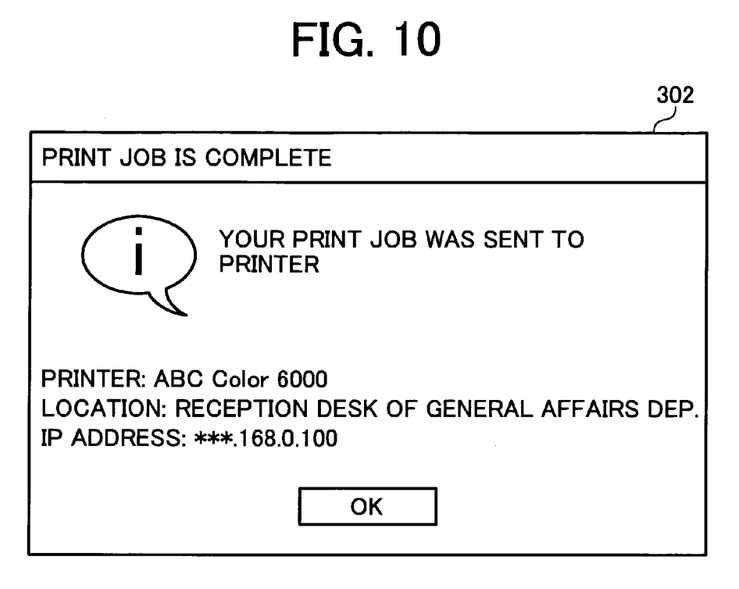
FIG. 10 is an example of an output destination notifying screen.

When there is only a single output destination that satisfies the search condition (No at step S110), the output destination is not displayed on the search result screen 300. The port generating unit 216 generates an output port to the single output destination (step S116), and notifies the user of the single output destination (step S118). FIG. 10 is an example of an output destination notifying screen 302. The output destination notifying screen 302 displays the single output destination with a message that "Your print job was sent to printer".

In this manner, if a single output destination is detected, the single output destination can be automatically specified as a suitable output destination. Consequently, the user's selection is unnecessary, which simplifies processing operation.

If there is no output destination that satisfies the search condition (No at step S108), the search-result display unit 210 displays one or more output destinations that partially satisfy the search condition with a warning on a warning screen 304 (step S140). In this case, for example, the output destination satisfies part of a plurality of search conditions.

Figure 11:
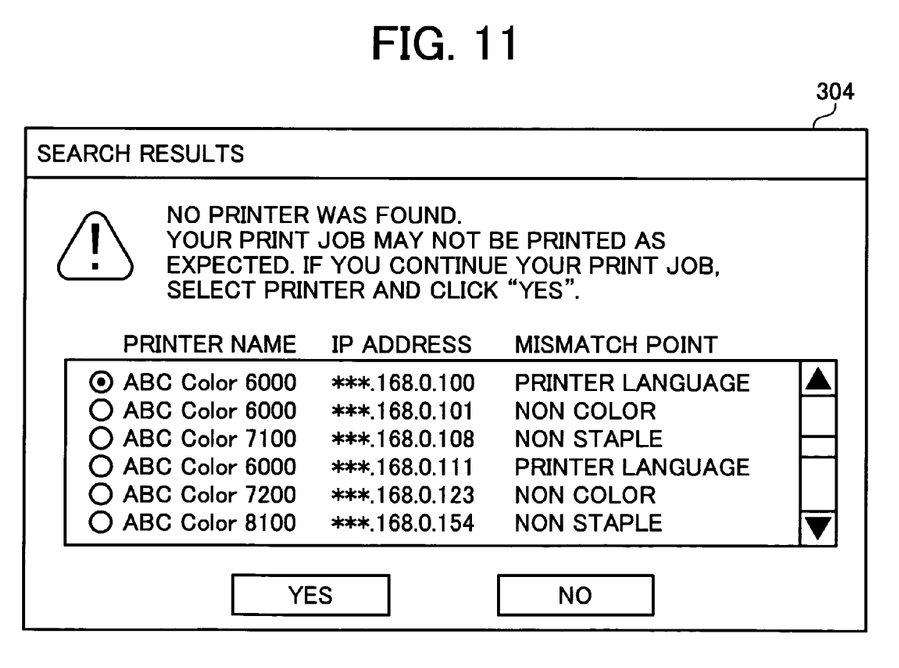
FIG. 11 is an example of a warning notifying screen 304.

FIG. 11 is an example of the warning screen 304. The warning screen 304 displays a message "No printer was found". The warning screen 304 also displays a point of the search conditions (hereinafter, "mismatch point") that the individual output destinations do not satisfy.

As explained above, a user is notified of mismatch points with respect to output destinations. Accordingly, based on those mismatch points, the user can select an output destination that can provide an acceptable print result or can determine not to select any of them. Incidentally, the warning screen 304 can display output destinations in descending order of degree to which the search condition is satisfied. This allows the user to easily grasp the degree to which each output destination satisfies the search condition.

Figure 12:
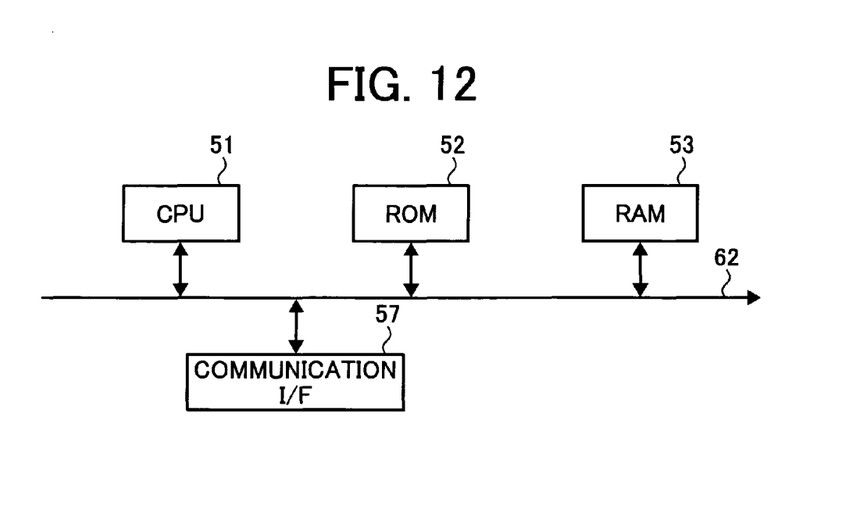
FIG. 12 is a schematic diagram of a hardware configuration of the terminal device.

FIG. 12 depicts a hardware configuration of the terminal device 10. The terminal device 10 includes a read-only memory (ROM) 52, a central processing unit (CPU) 51, a random access memory (RAM) 53, a communication interface (I/F) 57, and a bus 62. The ROM 52 stores therein a computer program (hereinafter, "information processing program") that causes the terminal device 10 to execute information processing. The CPU 51 controls each unit of the terminal device 10 according to the information processing program. The RAM 53 stores therein various data necessary to control the terminal device 10. The communication I/F 57 is an interface to the network for communication, and the bus 62 connects the individual units.

The information processing program can be provided as being recorded on a computer-readable recording medium in an installable or executable file format. Examples of the computer-readable recording medium include a compact disc read-only memory (CD-ROM), a flexible disk (FD), and a digital versatile disc (DVD).

The information processing program is loaded from the recording medium into a main memory of the terminal device 10 to be executed. Thus, the units explained above are implemented on the main memory.

Alternatively, the information processing program can be stored in a computer connected to the terminal device 10 via a network such as the Internet, and downloaded therefrom via the network to the terminal device 10.

Incidentally, the above-described embodiment is susceptible of various modifications. For example, in the process at step S112 of FIG. 7, an output destination that does not satisfy the search condition can be displayed on the search result screen 300 in addition to the output destinations that satisfy the search condition. In the process at step S140 of FIG. 7, all output destinations connected via the network 2 can be displayed on the warning screen 304.

Figure 13:
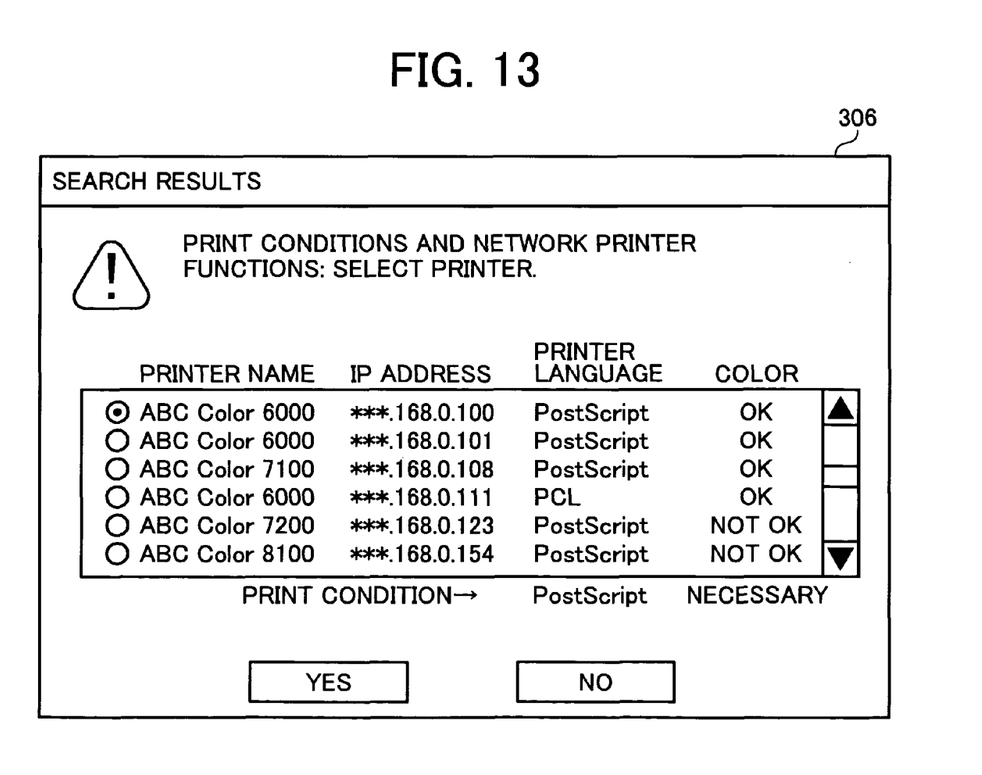
FIG. 13 is an example of a search result screen further displaying output destinations that do not satisfy a search condition.

FIG. 13 is an example of a search result screen 306 further displaying output destinations that do not satisfy the search condition. The search result screen 306 first displays output destinations that satisfy the search condition, and then those that do not satisfy the search condition. Furthermore, functions corresponding to the search condition are also displayed in association with the individual output destination.

For example, in the example of FIG. 13, "PostScript printer" and "Color printer" joined together with "and" are specified as search conditions. As a result, the search result screen 306 displays color PostScript printers in black letters, while a printer control language (PCL) printer and non-color printers are displayed in gray letters. In other words, output destinations that satisfy the search conditions are displayed in a different manner than those that do not satisfy them. This allows a user to easily grasp search results.

As set forth hereinabove, according to an embodiment of the present invention, target data can be transmitted to an external device suitable to process the target data without any complicated operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device that is configured to be connected via a network to a plurality of external devices and output data through one of the external devices, the information processing device comprising:
   an information acquiring unit that acquires characteristic information indicating a feature of print object data;
   a searching unit that searches the network for an external device to which the object data is to be output based on the characteristic information acquired by the information acquiring unit;
   a virtual output port generating unit that generates a virtual output port that sets the external device as an external device to which the print object data is to be output based on information regarding the external device; and
   a transmitting unit that transmits the print object data to the external device through the virtual output port; and
   a virtual output port deleting unit that deletes the virtual output port after the print object data is transmitted.

2. The information processing device according to claim 1, further comprising:
   a storage unit that stores therein the characteristic information and a search condition for searching for the external device, the characteristic information being associated with search condition; and a search condition specifying unit that refers to the storage unit to specifying the search condition associated with the characteristic information, wherein the searching unit searches for an external device based on the search condition.

3. The information processing device according to claim 1, wherein the virtual output port uses a transmission control protocol/Internet protocol.

4. The information processing device according to claim 1, further comprising a display unit that displays a search-result obtained by the searching unit.

5. The information processing device according to claim 4, wherein, when the searching unit detects a plurality of external devices, the display unit displays the external devices, the information processing device further comprising:

an input unit that receives input specifying an external device selected from the external devices displayed on the display unit, wherein the virtual output port generating unit generates the virtual output port to the external device selected through the input unit.

6. The information processing device according to claim 5, wherein the display unit displays external devices that partially satisfy the search condition when the searching unit detects no external device that fully satisfies the search condition, and the input unit receives input specifying an external device selected from the external devices that partially satisfies the search condition.

7. The information processing device according to claim 6, wherein the display unit displays a point of the search condition that each of the external devices does not satisfy.

8. The information processing device according to claim 5, wherein the display unit displays the external devices connected via the network when the searching unit detects no external device that fully satisfies the search condition, and the input unit receives input specifying an external device selected from the external devices connected via the network.

9. The information processing device according to claim 8, wherein the display unit displays a point of the search condition that each of the external devices does not satisfy.

10. The information processing device according to claim 1, wherein, when the searching unit detects one external device, the virtual output port generating unit generates a virtual output port to the external device detected by the searching unit.

11. The information processing device according to claim 1, wherein the information acquiring unit acquires the characteristic information related to creation of the data from an application used to create the data.

12. The information processing device according to claim 1, wherein each of the external devices is a printer, and the data is print data to be printed by the printer.

13. The information processing device according to claim 12, wherein the information acquiring unit acquires the characteristic information related to printing of the data from a printer driver corresponding to the printer.

14. The information processing device according to claim 13, wherein the information acquiring unit acquires the characteristic information related to a printer language from the printer driver.

15. The information processing device according to claim 13, wherein the information acquiring unit acquires the characteristic information related to hardware necessary for the printer from the printer driver.

16. The information processing device according to claim 1, wherein the information acquiring unit acquires the characteristic information related to a type of the data from a spooler that spools the data.

17. The information processing device according to claim 1, wherein the information acquiring unit acquires the characteristic information related to an operating system from the operating system of the information processing device.

18. An information processing method applied to an information processing device that is configured to be connected via a network to a plurality of external devices and output data through one of the external devices, the information processing method comprising:

acquiring characteristic information indicating a feature of print object data;

searching the network for an external device to which the print object data is to be output based on the characteristic information acquired by the information acquiring unit;

generating a virtual output port that sets the external device as an external device to which the print object data is to be output based on the information regarding the external device; and transmitting the data to the external device through the virtual output port deleting the virtual output port after transmitting the data to the external device.

19. A non-transitory computer readable recording medium having computer readable program codes embodied in the non-transitory computer readable recording medium that, when executed, cause a computer that is configured to be connected via a network to a plurality of external devices and output data through one of the external devices to execute:

acquiring characteristic information indicating a feature of print object data;

searching the network for an external device to which the print object data is to be output based on the characteristic information acquired by the information acquiring unit;

generating a virtual output port that sets the external device as an external device to which the print object data is to be output based on the information regarding the external device; and transmitting the data to the external device through the virtual output port deleting the virtual output port after transmitting the data to the external device.

* * * * *